United States Patent
Ehrhardt et al.

(10) Patent No.: US 8,533,074 B1
(45) Date of Patent: Sep. 10, 2013

(54) LOST AND DAMAGED ITEMS IN A FULFILLMENT NETWORK

(75) Inventors: John Ehrhardt, Newcastle, WA (US); Madeleine J. Fish, Issaquah, WA (US); Chad G. Goelzer, Puyallup, WA (US); Mahendra Nerurkar, Seattle, WA (US); A. Lorraine Nicholson, Edmonds, WA (US); Cynthia W. Williams, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 15 days.

(21) Appl. No.: 13/076,181

(22) Filed: Mar. 30, 2011

(51) Int. Cl.
*G06Q 10/00* (2012.01)

(52) U.S. Cl.
USPC .......... 705/28; 705/22; 705/34; 705/330; 709/220

(58) Field of Classification Search
USPC .......... 705/28, 8, 330; 370/310; 379/88.12; 455/518, 3.2
See application file for complete search history.

(56) References Cited

U.S. PATENT DOCUMENTS

| | | | | |
|---|---|---|---|---|
| 6,112,085 | A * | 8/2000 | Garner et al. | 455/428 |
| 6,636,721 | B2 * | 10/2003 | Threadgill et al. | 455/12.1 |
| 7,058,596 | B1 * | 6/2006 | Wojcik et al. | 705/26.81 |
| 7,216,086 | B1 * | 5/2007 | Grosvenor et al. | 705/7.11 |
| 7,289,969 | B1 * | 10/2007 | Ballenger et al. | 705/28 |
| 7,742,928 | B2 * | 6/2010 | Reynolds et al. | 705/330 |
| 2003/0097287 | A1 * | 5/2003 | Franz et al. | 705/8 |
| 2003/0120565 | A1 * | 6/2003 | Church et al. | 705/28 |
| 2004/0054554 | A1 * | 3/2004 | Barts et al. | 705/1 |
| 2008/0162304 | A1 * | 7/2008 | Ourega | 705/27 |
| 2008/0301009 | A1 * | 12/2008 | Plaster et al. | 705/28 |

\* cited by examiner

*Primary Examiner* — Vanel Frenel
(74) *Attorney, Agent, or Firm* — Thomas | Horstemeyer, LLP

(57) ABSTRACT

Disclosed are various embodiments for identifying damaged and/or missing items in a fulfillment center. Embodiments of the disclosure can also evaluate loss claims made by a seller for items the seller believes are missing from an inbound shipment to the fulfillment center. Embodiments of the disclosure can also generate a resolution in the form of compensation to the seller if a claim is valid. Shipment data that can include carrier data from a carrier system can also be analyzed to determine the validity of loss claims submitted by a seller.

17 Claims, 6 Drawing Sheets

LOST AND DAMAGED ITEMS IN A FULFILLMENT NETWORK

BACKGROUND

Sellers participating in a marketplace facilitated by an electronic commerce site can employ a fulfillment network associated with the electronic commerce site to fulfill orders by users in the marketplace. To this end, sellers may send shipments containing one or more parcels with products to one or more fulfillment centers in a fulfillment network. Accordingly, products associated with an inventory of a seller may become damaged in the fulfillment network. Additionally, products may also be lost in the fulfillment network as well as during transit to the fulfillment network. Sellers can be compensated for such a loss if it is determined that the loss is the fault of the fulfillment network.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the disclosure are directed to systems and methods that detect damage and/or loss of inventory housed within and/or in transit to a fulfillment network. Sellers participating in an electronic marketplace may employ services of a fulfillment network comprised of one or more fulfillment centers to fulfill orders placed by customers in the marketplace. Accordingly, sellers may ship inventory to the fulfillment network to be warehoused in anticipation of orders. Items in a fulfillment center can be damaged and/or lost by personnel during transit, receiving, handling, or shipment to customers during fulfillment of orders. In other words, inventory defects may occur during the course of the lifetime of an item in connection with the fulfillment network. Therefore, embodiments of the disclosure can detect these inventory defects as well as determine whether the fulfillment network is at fault and then generate a resolution for the inventory defect (e.g., compensation for the seller). In the following discussion, a general description of the system and its components is provided, followed by a discussion of the operation of the same.

Figure 1:
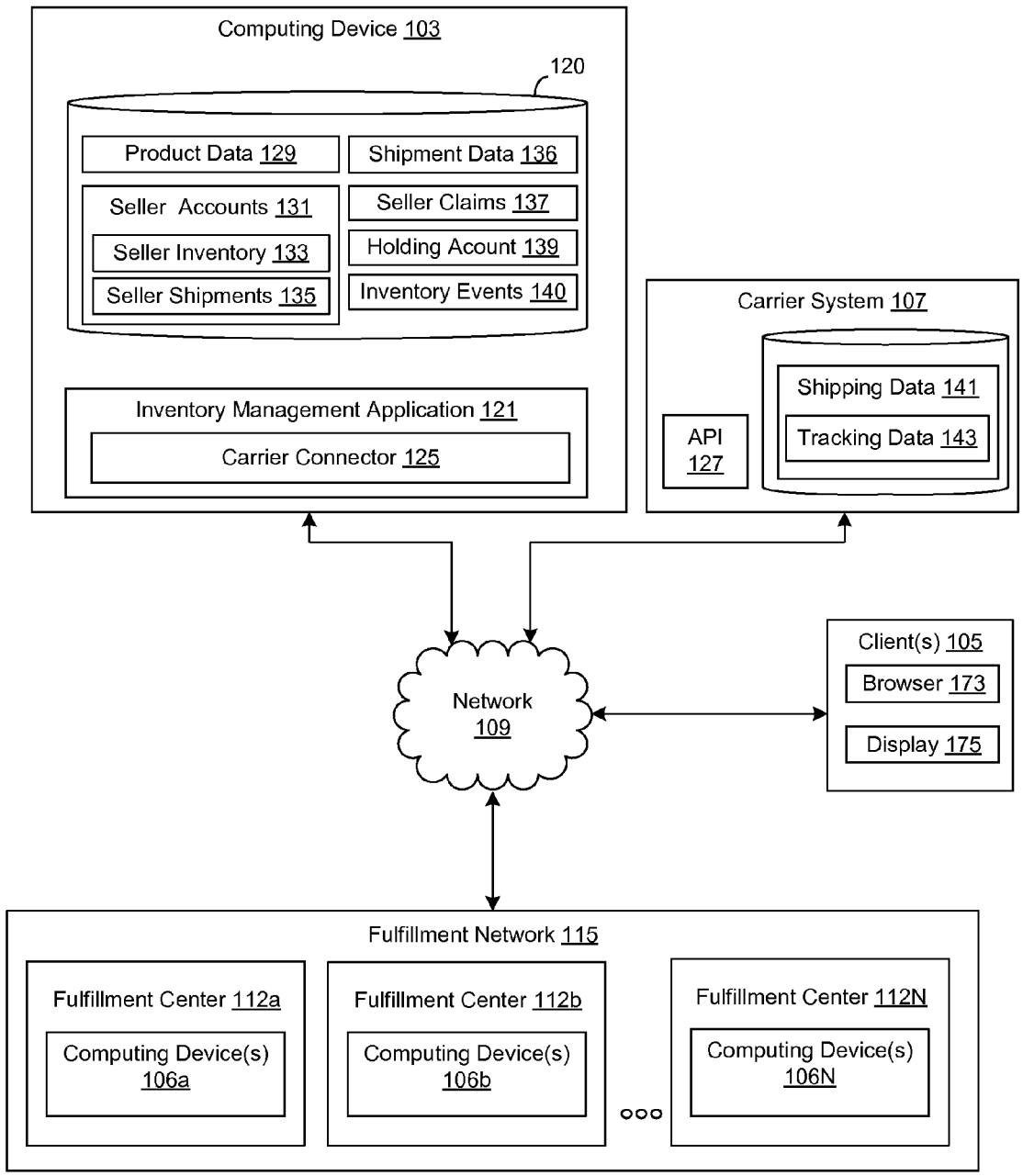
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 105 as well as one or more computing devices 106a, 106b . . . 106N by way of a network 109. Each computing device 106a, 106b . . . 106N can correspond to a respective fulfillment center 112a, 112b . . . 112N within a fulfillment network 115. The networked environment can also include a carrier system 107 in communication with one or more of the above systems via the network 109. The network 109 can include, for example, the Internet, intranets, extranets, wide area networks (WANs), local area networks (LANs), wired networks, wireless networks, or other suitable networks, etc., or any combination of two or more such networks.

Various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below.

The components executed on the computing device 103, for example, include an inventory management application 121, carrier connector 125, and other applications, services, processes, systems, engines, or functionality not discussed in detail herein. In some embodiments, the computing device 103 can execute an electronic commerce application that facilitates an electronic commerce site associated with one or more sellers through which customers can purchase, rent, and/or download products. To this end, the computing device 103 can process orders on behalf of customers and transmit network pages or other user interface elements that can be rendered on a client 105. The specific functionality and various implementations of an electronic commerce site that can be facilitated by the computing device 103 should be appreciated by a person of ordinary skill in the art, and is not discuss in detail herein. Additionally, the carrier system 107 can also be implemented in one or more computing devices.

The inventory management application 121 is executed in order to facilitate interactions with sellers who may offer products in a marketplace for which fulfillment is facilitated by the fulfillment network 115. In one embodiment, the inventory management application 121 can interact with sellers via a user interface rendered on a client 105 in which a seller can manage a seller account, inventory, payments, and perform other functions related to the process of offering products to users of an electronic marketplace in which products can be fulfilled to customers via the fulfillment network 115. In some embodiments, the inventory management application 121 can receive information from a seller about shipments to the fulfillment network 115, where the shipments contain products that can be fulfilled by a fulfillment center 112 to customers on behalf of the seller.

The inventory management application 121 is also configured to manage inventories of items held at the fulfillment centers 112. Accordingly, the inventory management application 121 can obtain data about inbound shipments received by a fulfillment center 112 in the fulfillment network 115 and update inventory data in the data store 120. Additionally, the inventory management application 121 can direct shipment of products to purchasers on behalf of a seller. The inventory management application 121 can also determine whether items in the fulfillment network 115 associated with an inventory of a seller are lost and/or damaged as well as determine a resolution for claims made by sellers that are related to lost and/or damaged items. The various ways in which the inventory management application 121 can operate are described in further detail below.

The carrier connector 125 can facilitate communication with an application programming interface 127 provided by the carrier system 107. The carrier connector 125 can facilitate retrieval or tracking data associated with parcels that are in turn associated with inbound shipments to the fulfillment network 115. In some embodiments, the carrier system 107 can push tracking data associated with parcels handled by a carrier to the carrier connector 125, which can provide the tracking data to subscribing systems and/or applications within an electronic commerce site. In one embodiment, tracking data associated with parcels can be generated whenever a product is scanned by a carrier device, and can be associated with a time, location, and other variables as can be appreciated.

Also, the computing device 103 can include at least one data store 120, which may comprise data and applications operable to provide access to the data stored therein. The data stored in the data store 120 includes, for example, product data 129, seller accounts 131, seller shipments 135, shipment data 136, seller claims 137, holding account 139, inventory events 140 and potentially other data. The product data 129 may include information related to one or more products available for fulfillment through the fulfillment network 115. Products can include any good, service, software download, multimedia download, social networking profile, or any combination, bundle, or package thereof, that may be offered for sale, purchase, rental, lease, download, and/or any other form of consumption as may be appreciated. The various data stored in the product data 129 may include, for example, titles, descriptions, quantities, conditions, images, options, weights, customer reviews, customer ratings, keywords, shipping restrictions, prices, tax classifications, unique identifiers, and any other data related to products.

Seller accounts 131 can include information about sellers who employ the services of a fulfillment network 115 to house inventory and/or fulfill products to customers placing orders from the seller in an electronic marketplace. Each seller employing the services of the fulfillment network 115 can be associated with a seller account 131, which may include, for example, a seller inventory 133 relating to products that are in the inventory of a seller. Entries for products can include a quantity, condition, and other information about items in a seller inventory 133. A seller account 131 can also include an account balance or other financial accounting data with which a seller can conduct business with customers in a marketplace, and/or an operator of the fulfillment network 115 and computing device 103.

A seller account can also be associated with seller shipments 135, which can specify information about shipments potentially containing inventory that are made by a seller to the fulfillment network 115. Seller shipments 135 can define information about parcels in a shipment, such as the products contained in a shipment, their quantities, and other information. In one embodiment, the seller can define various data that is accessible on a shipping label, packing list, manifest, or other documents regarding a shipment and/or parcels that are accessible in the fulfillment network 115. For example, the seller can specify a shipment tracking number associated with a particular parcel of a shipment as well as the products and quantities contained within the parcel.

The data store 120 can also contain shipment data 136 that is related to shipments and parcels included in shipments that are received and/or processed in the fulfillment network 115. Shipment data 136 can include information identified by a fulfillment center 112 such as shipment tracking information, the condition of parcels received in the fulfillment center 112, parcel weights, items contained within shipments, and other information that is identified when a shipment is received in a fulfillment center 112. As is described below, the shipment data 136 identified by the fulfillment network 115 about shipments received in a fulfillment center 112 can be used to determine whether there are inconsistencies between seller shipment 135 provided by a seller and the actual data about a shipment that is captured when a shipment is received in the fulfillment network 115. Inventory events 140 can include data regarding events received from one or more computing devices 106 associated with fulfillment centers 112. Inventory events 140 are events that are related to occurrences within a fulfillment network 115 such as the receipt of inventory associated with a seller, damaged items, missing items, inventory counts, and other occurrences. The inventory management application 121 can analyze inventory events to identify whether a seller should be compensated for missing and/or damaged items in a fulfillment network 115.

The data store 120 can also include information about seller claims 137. In various embodiments of the disclosure, a seller can submit a claim via a user interface provided by the inventory management application 121 regarding items in a seller inventory 133 that the seller believes are lost or damaged. Accordingly, as is described below, the inventory management application 121 can determine the validity of a claim and generate a resolution for the claims on behalf of an operator of the fulfillment network 115. The data store 120 can also include data regarding a holding account 139. A holding account 139 can be an account that is associated with an operator of the fulfillment network 115 to which items that are related to loss claims filed by a seller can be assigned. As will be described below in further detail below, items associated with a seller inventory 133 may be lost in fulfillment network 115. Therefore, a seller account can be compensated for this loss. However, if such an item is later found, the ownership of the item can be assigned to a holding account 139, as the seller has already been compensated for its loss. Other examples and variations of the potential applications of the holding account 139 are described in further detail below.

The carrier system 107 can include one or more computing devices from which shipment data about parcels can be received in the computing device 103. The carrier system 107 can include shipping data 141 that is related to parcels that can be associated with orders in an electronic commerce site. Shipping data 141 can include tracking data 143 related to various parcels that is maintained by a carrier. Tracking data 143 can include a tracking number as well as scan data that tracks each time a parcel is scanned by a carrier in transit to or from a customer as can be appreciated. The carrier system 107 can also provide an API 127 through which tracking data 143 can be retrieved by the carrier connector 125. In some embodiments, the carrier system 107 can push tracking data to the computing device 103 via an API provided therein. It should be appreciated that the carrier system 107 can be representative of multiple carrier systems 105 that may also be associated with various carriers, who may provide varying APIs 127 or other ways to retrieve tracking data 143 related to parcels that are associated with customer orders. In other embodiments, a carrier system 107 and the carrier connector 125 can communicate via electronic data interchange messages or other methods to communicate tracking data 143 as can be appreciated.

The client 105 is representative of a plurality of client devices that may be coupled to the network 109. The client 105 may comprise, for example, a processor-based system such as a computer system and/or mobile device. Such computer system may be embodied in the form of a desktop computer, a laptop computer, a personal digital assistant, a cellular telephone, set-top box, music players, web pads, tablet computer systems, game consoles, or other devices with like capability. The client 105 may be configured to execute various applications such as a browser 173 and/or other applications. The browser 173 may be executed in a client 105, for example, to access and render network pages, such as web pages, or other network content served up by the inventory management application 121 to facilitate management of inventory, submission of claims, etc. A client 105 can also be configured to execute a special purpose application, such as a mobile application, which may include client side code that renders a user interface that includes data provided by another system.

Next, a general description of the operation of the various components of the networked environment 100 is provided. To begin, the inventory management application 121 can detect and generate resolutions for various scenarios related to loss and/or damage of items in connection with a fulfillment network 115. One example of such a scenario includes damage to an item that can be attributed to the fault of the fulfillment network 115.

For example, if employees or other personnel associated with the fulfillment network 115 cause an event that damages an item (e.g., the item is dropped by personnel), the inventory management application 121 can generate a resolution that compensates a seller associated with the damaged item for the damage. Damage to an item can occur during receiving of a shipment to the fulfillment network 115, transfer of the item to an inventory storage location, transfer of the item to a shipping area during order fulfillment, or any other event that can cause damage to the item. In one embodiment, personnel associated with the fulfillment center 112 can cause a damaged inventory event associated with a damaged item to be generated, which can be transmitted to the inventory management application 121. In one example, a computing device 106 such as a handheld data entry device can allow personnel to enter information about a damaged inventory event, which can include a seller identifier, product identifier, information about the type of damage to the item, a cause of the damage, images of the damaged item, and other information. To this end, the handheld data entry device may include a barcode scanner, camera or other input devices with which data can be captured about the damaged item. Upon receiving a damaged inventory event from the computing device 106, the inventory management application 121 can generate an inventory defect that is associated with a seller account 131.

The damaged item can also be rated or scored by personnel in the fulfillment center 112 so that a value of the damaged item can be determined by the inventory management application 121. In one example, the item can be rated on a numerical scale that reflects condition of the item. In another example, the damaged item can be rated according to various categories that allow the inventory management application 121 to assess compensation for the seller. For example, categories that can include "cosmetic damage," "damage to packaging only," "destroyed," and other categories reflecting a condition of a damaged item can be established and provided in a user interface on the computing device 106. Accordingly, personnel in the fulfillment network 115 can select the applicable categories in the user interface, and the selected categories can be transmitted to the inventory management application 121 as a part of the damaged inventory event associated with the damaged item. Accordingly, the inventory management application 121 can store the damaged inventory event in the data store 120. In some embodiments, the computing device 106 associated with a fulfillment center can communicate directly with the data store 120 via the network 109 to store the damaged inventory event.

In response to a damaged inventory event retrieved from the data store 120 and/or received from a computing device 106 associated with the fulfillment network 115, the inventory management application 121 can determine a resolution. In one embodiment, if the damaged inventory event reflects that the item was damaged in the fulfillment network 115 for reasons that are the fault of the fulfillment network 115, the inventory management application 121 can initiate reimbursement to the seller of a replacement value determined by the inventory management application 121.

The replacement value of the damaged item can be determined by analyzing various factors associated with the item. In one embodiment, the inventory management application 121 can extract a listing price of a sales listing for the item that associated with the seller from the product data 129, and initiate reimbursement of the seller account 131 by this amount. In another embodiment, the inventory management application 121 can determine an average listing price over a specified time period that is associated with the item across one or more other sellers associated with a sales listing for the item in a marketplace. In other embodiment, the inventory management application 121 can determine the lowest listing price over a specified time period that is associated with the item that is associated with any other seller in a marketplace. In yet some embodiments, the data store 120 may include data regarding default replacement values for various products. Accordingly, the inventory management application 121 can determine if the damaged item is associated with a product identifier for which a default replacement value exists in the data store 120. Upon determining a replacement value associated with the damaged item, the inventory management application 121 can initiate reimbursement of the seller account 131 for the damaged item. In other embodiments, a seller may refuse reimbursement of replacement value calculated by the inventory management application 121 and demand return of the damaged item. Accordingly, the inventory management application 121 can direct the fulfillment network 115 to ship the damaged item to the seller. In other embodiments, the inventory management application 121 can purchase the item from another seller housing a like item in the fulfillment network 115 and transfer ownership of the item to the seller.

Upon generating a resolution (e.g. reimbursement) for a seller in connection with a damaged item, ownership of the damaged item can be transferred to the holding account 139. As referenced above, a holding account 139 can be an account that is associated with an operator of the fulfillment network 115 to which items that are related to loss claims filed by a seller can be assigned. Because the seller has been compensated for the loss of the item, ownership of the item can be transferred. Accordingly, an operator of the fulfillment network 115 can resell, liquidate or otherwise dispose of the item.

In some embodiments, inventory in the fulfillment network 115 associated with various sellers can be commingled. In other words, because certain items are fungible, they may be commingled in the inventory without regard to a specific seller to which a specific item belongs. Accordingly, a damaged inventory event generated by fulfillment network 115 personnel via a computing device 106 may not be associated with a particular seller in the case of a damaged item that is in a commingled inventory. Therefore, the inventory management application 121 can implement an algorithm to identify a seller from among multiple sellers having a quantity of the item in a seller inventory 133 to which compensation in the form of reimbursement of replacement value should be initiated. In one example, the inventory management application 121 can randomly select a seller from among sellers having a quantity of the item in a corresponding seller inventory 133. Other algorithms for assigning ownership of the damaged item from a commingled inventory to a seller can also be employed.

The inventory management application 121 can also generate a resolution in the case of items that are lost in the fulfillment network 115. As can be appreciated, items associated with a seller inventory 133 can be lost for a host of reasons. In some embodiments, a periodic actual inventory count for various items warehoused in a fulfillment network 115 can be captured by fulfillment network 115 personnel and transmitted to the inventory management application 121 via the computing device 106. In one embodiment, fulfillment center 112 personnel can perform inventory counts on a periodic basis at various inventory locations in a fulfillment center 112 that are associated with sellers and/or items, and the inventory count data can be transmitted to the inventory management application 121. In some embodiments, the inventory counts reflecting actual inventory in the fulfillment network 115 can be performed on an automated basis.

Accordingly, the inventory management application 121 can generate an inventory snapshot reflecting an actual quantity of various items in the fulfillment network 115 corresponding to various seller accounts 131. The inventory snapshot can be stored in the data store 120 in the seller inventory 133 and updated as additional inventory counts are received from the fulfillment network 115. The inventory management application 121 can compare the inventory snapshot associated with a seller account 131 against an expected seller inventory 133 to determine whether there are missing and/or surplus items in the fulfillment network 115. Such an inventory snapshot can be generated periodically based upon the most recent inventory counts received from the fulfillment network 115. In one embodiment, the inventory snapshot can be generated periodically, such as, for example, hourly, daily, weekly, monthly, etc. In some embodiments, a fulfillment center 112 computing device 103 can generate missing item events, which can be received by the inventory management application 121 from the computing device 106 via the network 109. A missing item event can include a seller identifier, a product identifier, and other information related to a missing item associated with a seller. Similarly, the inventory management application 121 can receive found item events that correspond to items that are found in the fulfillment network 115. Upon receiving such an event, the inventory management application 121 can update an actual inventory in the seller inventory 133 in the data store 120.

In order to identify whether an item can be classified as missing, the inventory management application 121 can employ a waiting period after a deficit of an item in a seller inventory 133 is detected. Because items lost in a fulfillment network 115 can later be found, the inventory management application 121 can employ such a waiting period before designating a deficit as a loss and triggering a resolution. In one embodiment, the inventory management application 121 can employ a thirty day waiting period upon detection of a deficit of an item in a seller inventory 133. Other waiting periods can be employed as can be appreciated. Upon the passing of the waiting period, if a deficit associated with an item persists and a subsequent inventory count does not reflect that the item has been found, the inventory management application 121 can designate the item as missing and generate a resolution. Upon classifying an item as missing, the inventory management application 121 can generate an inventory defect and associate it with the seller account 131. Accordingly, the inventory management application 121 can initiate a resolution in the form of compensation to a seller for the missing item. In one embodiment, the inventory management application 121 can initiate reimbursement of replacement value to the seller account 131 as described above in reference to compensation for a damaged item. Upon compensating a seller account 131, the inventory management application 121 can reduce the seller inventory 133 by a quantity corresponding to the number of missing items for which the seller was compensated.

As also referenced above, inventory in the fulfillment network 115 associated with various sellers can be commingled. Accordingly, an inventory count associated with a commingled item may be received on an aggregate basis. That is to say, a total inventory count associated with the commingled item may be received, and the inventory management application 121 can determined whether an item is missing by comparing the aggregate count against a total quantity of the item in the seller inventory 133 of all sellers having a quantity of the item in their inventories in the data store 120. Therefore, the inventory management application 121 can implement an algorithm to identify a seller from among multiple sellers having a quantity of the item in a seller inventory 133 to which compensation in the form of reimbursement of replacement value should be initiated. In one example, the inventory management application 121 can randomly select a seller from among sellers having a quantity of the item in a corresponding seller inventory 133. Other algorithms for assigning ownership of the damaged item from a commingled inventory to a seller can also be employed.

In some embodiments, a missing item may be found in the fulfillment network 115 after the waiting period has passed and a seller has been compensated for the missing item. Accordingly, the inventory management application 121 can handle such a scenario in various ways. As one example, if an inventory snapshot based upon inventory counts and/or found item events reflect a surplus for a particular seller account 131, the inventory management application 121 can transfer ownership of the surplus items to the holding account 139. Thereafter, if a subsequent deficit associated with a seller account 131 is detected by the inventory management application 121, it can transfer ownership of this surplus item from the holding account 139 to the seller account 131 reflecting a deficit without having to initiate reimbursement of replacement value corresponding to the item.

The inventory management application 121 can also facilitate loss claims initiated by a seller that are related to inbound shipments to the fulfillment network 115. In one embodiment, a seller can define data regarding inbound shipments to the fulfillment network via a client 105. An inbound shipment can include one or more parcels containing items to be housed in the fulfillment center 112 and associated with the seller inventory 133. Accordingly, seller shipments 135 can define the expected product identifiers and quantities associated with an inbound shipment, shipment identifiers, tracking data, purchase order data, bill of lading data, or any other data associated with a shipment.

When one or more parcels associated with an inbound shipment arrives to a fulfillment center 112 in the fulfillment network 115, a shipment identifier, tracking identifier, purchaser order identifier, or any other identifier with which the inventory management application 121 can associate the inbound shipment with a seller shipment 135 in the data store 120 can be extracted and transmitted to the inventory management application 121. The inventory management application 121 can store any data regarding an inbound shipment received in a fulfillment center 112 as shipment data 136 in the data store. Additionally, the one or more parcels can also be weighed as a part of the receiving process and the weight of the one or more parcels of the inbound shipment can also be provided to the inventory management application 121 and stored as shipment data 136.

Products contained within the inbound shipment can be scanned or otherwise counted, and inventory addition events associated with the seller account 131 that correspond to a quantity of the products contained within the inbound shipment can be generated by a fulfillment center 112 computing device 106. Inventory addition events associated with an inbound shipment can be stored as shipment data 136 in the data store 120. In one embodiment, such a computing device 106 can include a handheld device with a barcode scanner that can scan product identifiers, shipment labels, or other data included with an inbound shipment. These inventory addition events can be transmitted to the inventory management application 121 via a fulfillment center 112 computing device 106, and the inventory management application 121 can update the seller inventory 133 associated with the seller account 131. In one embodiment, inventory addition events can be stored as shipment data 136, and the inventory management application 121 can process the events to update a seller inventory 133.

Accordingly, sellers may submit loss claims to the inventory management application 121 via a user interface on a client 105. Loss claims can be related to items a seller believes should be reflected in a seller inventory 133 associated with a seller account 131 and that the seller believes were lost from an inbound shipment processed by the fulfillment network 115. A loss claim can be associated with a particular inbound shipment that can be identified by shipment tracking data, shipment identifier, purchase order identifier, or any other information with which an inbound shipment of items to the fulfillment network 115 can be identified. The inventory management application 121 can employ various methods to validate a claim submitted by a seller to determine whether the claim should be approved or denied. In other words, the inventory management application 121 can determine whether a seller should be compensated because the fulfillment network 115 has lost items from an inbound shipment sent by the seller to the fulfillment network 115.

In one embodiment, the inventory management application 121 can compare a weight of the one or more parcels associated with an inbound shipment against an expected weight of the shipment. An expected weight of parcels of a shipment can be determined based at least upon an expected quantity of a particular item associated with a parcel. The inventory management application 121 can determine the expected weight of a parcel based upon a weight associated with one or more products in a parcel, which can be retrieved from the product data 129 and the expected quantity of the products in a parcel. If the expected weight is within a weight threshold percentage of the actual weight of the parcel, the inventory management application 121 can determine that the expected quantity was likely contained within the parcel. The actual weight of the parcel can be determined by a weight measurement taken with a weighing apparatus in a fulfillment center 112 upon receipt of the inbound shipment. In some embodiments, the actual weight can be determined by extracting the weight of a parcel via the carrier connector 125 from a carrier system 107 that provides tracking information and other data regarding shipments.

If the actual weight of a parcel associated with an inbound shipment is less than a calculated expected weight, the inventory management application 121 can deny the claim submitted by the seller. If the actual weight of the parcel is within a weight threshold of the expected weight, the inventory management application 121 can flag the claim for additional investigation and/or approve the claim, triggering compensation for the seller.

In some embodiments, a fulfillment network 115 may reject one or more parcels associated with an inbound shipment if they violate one or more shipping policies. A shipping policy can include a policy regarding hazardous materials shipment, packaging requirements, governmental regulations, seizure by a governmental authority, or any other policy that can cause the fulfillment network 115 to reject a parcel. Accordingly, if the fulfillment network 115 rejects a parcel associated with an inbound shipment, the inventory management application 121 can store information about the rejection, such as information about the shipping policy that was violated, as shipment data 136 in the data store 120. Therefore, if a loss claim submitted by a seller is associated with an inbound shipment that violates a shipping policy, the claim can be rejected by the inventory management application 121.

In another embodiment, the inventory management application 121 can determine whether a parcel associated with a claim submitted by a seller has not been received in a fulfillment center 112. The inventory management application 121 can retrieve tracking data 143 associated with a parcel from the carrier system 107 via the carrier connector 125 and determine whether the carrier status information associated with the parcel reflects that the shipment has not been received by the fulfillment network 115. If the parcel associated with the loss claim has not been received from the fulfillment network 115, the inventory management application 121 can deny the claim.

In another embodiment, the inventory management application 121 can determine whether a parcel associated with a claim submitted by a seller has been damaged by the carrier with which the seller shipped the inbound shipment to the fulfillment network 115. The inventory management application 121 can retrieve tracking data 143 associated with a parcel from the carrier system 107 via the carrier connector 125 and determine whether the carrier status information associated with the parcel reflects that the shipment was damaged by the carrier. If the carrier employed by the seller is on an approved carrier list, the inventory management application 121 can approve the claim and compensate the seller for the damaged items associated with the inbound shipment. In some embodiments, the inventory management application 121 can flag the claim for additional investigation so that inventory management application 121 personnel can determine the extent of the damage caused by the carrier. If the carrier employed by the seller is not on an approved carrier list, the inventory management application 121 can deny the claim.

The inventory management application 121 can also determine validity of a claim submitted by a seller by identifying potential errors in seller shipments 135 defined by a seller. As one example, a seller may transpose quantities of various products in an inbound shipment when specifying information an inbound shipment. For example, the seller may specify that an inbound shipment contains a quantity of five of product X and a quantity of six of product Y. However, the inventory addition events may specify that the shipment processed by the fulfillment network 115 contained a quantity of six of product X and a quantity of five of product Y. Accordingly, the inventory management application 121 can deny a loss claim from a seller related to a shortage of product Y if there is a corresponding surplus of another item in the inbound shipment compared to the information defined by the seller in seller shipments 135.

In some embodiments, fulfillment network 115 personnel may associate an inbound shipment with the wrong seller. Accordingly, the seller inventory 133 associated with the wrong seller may reflect a surplus of one or more products. If a loss claim is received by a seller for products for which a surplus is reflected in the seller inventory 133 of the wrong seller, the inventory management application 121 can transfer ownership of the items from the wrong seller to the seller submitting a claim. If the items for which a surplus is reflected in the seller inventory 133 of the wrong seller are sold, lost and/or damaged, the inventory management application 121 can approve the claim and trigger compensation for the seller.

Figure 2:
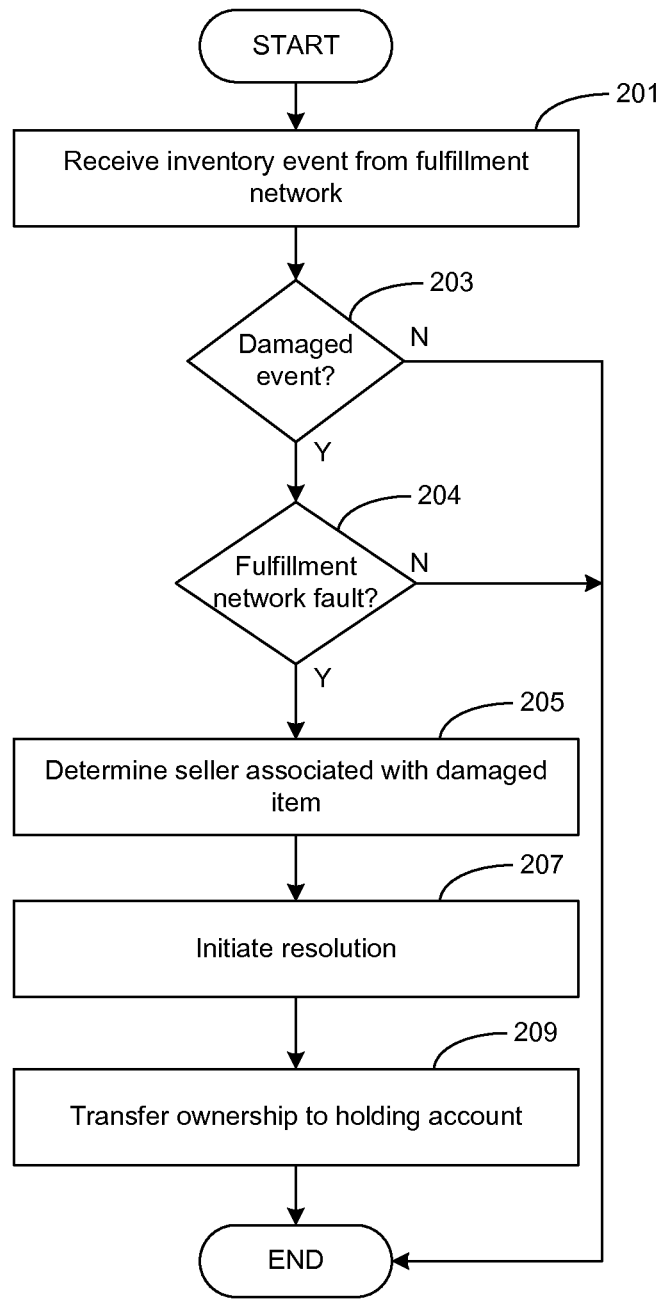
FIGS. 2-4 are flowcharts illustrating examples of functionality implemented as portions of the inventory management application executed in a computing device in the networked environment of FIG. 1 according to various embodiments of the present disclosure.
Figure 3:
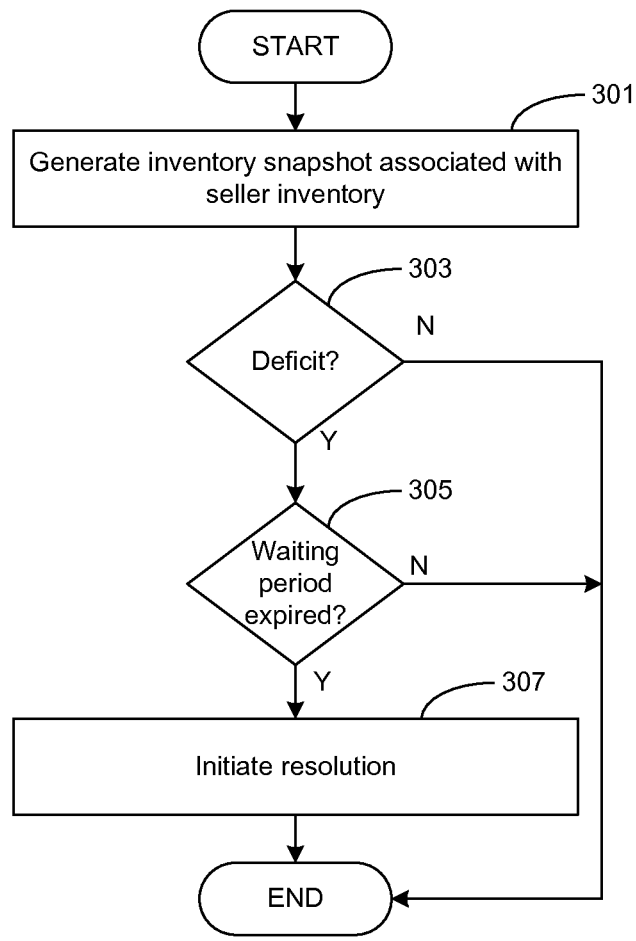
Figure 4:
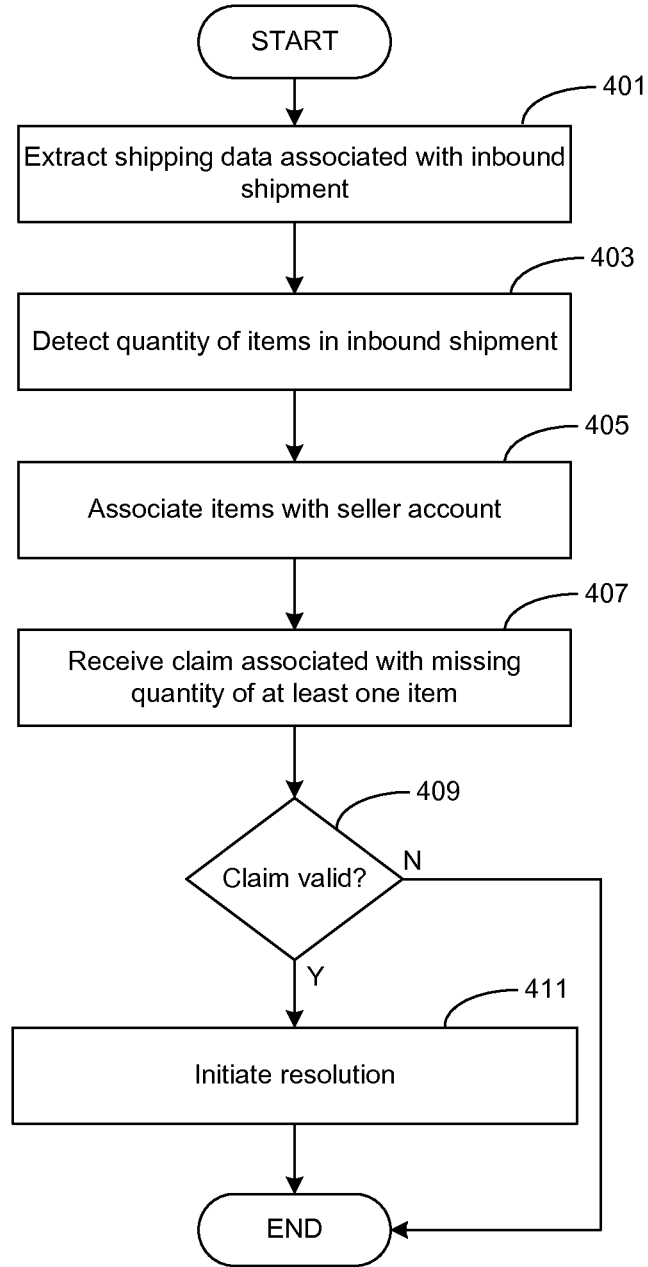

Referring next to FIGS. 2-4, shown are flowcharts that provide examples of the operation of a portion of the inventory management application 121 according to various embodiments. It is understood that the flowcharts of FIGS. 2-4 provides merely examples of the many different types of functional arrangements that may be employed to implement the operation of the portion of the inventory management application 121 as described herein. As an alternative, the flowcharts of FIGS. 2-4 may be viewed as depicting examples of steps of a method implemented in the computing device 103 (FIG. 1) according to one or more embodiments.

FIG. 2 illustrates an example of the inventory management application 121 detecting an item damaged in a fulfillment network 115. Beginning with box 201, the inventory management application 121 can receive an inventory event from the fulfillment network 115 associated with a product identifier. The inventory event corresponds to at least one item in a fulfillment network 115. In box 203, the inventory management application 121 can determine whether the inventory event corresponds to a damaged item in the fulfillment network 115. If the event corresponds to a damaged item, the inventory management application 121 can determine whether the fulfillment network 115 is at fault for the damaged item in box 204. In some embodiments, the inventory management application 121 can determine from a damaged inventory event whether the item was damaged due to the fault of the fulfillment network 115 (e.g., personnel in a fulfillment center). If the damaged item is the fault of the fulfillment network 115, the inventory management application 121 can determine a seller associated with the damaged item in box 205. In the case of an item that is not in a commingled inventory in the fulfillment center 112, the inventory management application 121 can identify the seller by extracting a seller identifier from the inventory event or any information from which a seller can be determined. As describe above, in the case of a damaged item from a commingled inventory in the fulfillment network 115, the inventory management application 121 can employ an algorithm that associates the item with a seller as noted above. In box 207, the inventory management application 121 can initiate a resolution, which can include reimbursement to a seller, replacement of the item, or other forms of compensation as described herein. Because the resolution compensates the seller for the damaged item, in box 209, ownership of the item can be transferred to a holding account associated with the fulfillment network 115.

Reference is now made to FIG. 3, which illustrates an example of a process in which the inventory management application 121 can detect a missing item in a fulfillment network 115 by performing periodic inventory snapshots associated with a seller inventory 133. In box 301, the inventory management application 121 can generate an inventory snapshot of an actual seller inventory in a fulfillment network 115. In box 303, the inventory management application 121 can compare the actual inventory to a seller inventory 133 in the data store 120 to determine whether a deficit of an item exists. Upon detection of a deficit in the seller inventory 133, the inventory management application 121 can then determine whether a waiting period has expired in box 305. If so, then in box 307, the inventory management application 121 can generate a resolution that can include compensation for the seller associated with the missing item in the fulfillment center.

Reference is now made to FIG. 4, which illustrates an example of a process in which the inventory management application 121 can evaluate a claim from a seller for missing items associated with an inbound shipment received in the fulfillment network 115. In box 401, the inventory management application 121 can extract shipping data associated with an inbound shipment that is received in the fulfillment network 115. In some embodiments, the inventory management application 121 can store the shipping data received from in the data store 120 so that loss claims from sellers regarding missing items can be evaluated. As noted above, the shipping data can include information such as tracking data, parcel weights, seller identifier, purchaser order data, bill of lading data, and any other data provided by a seller in connection with an inbound shipment. In box 403, the inventory management application 121 can detect a quantity of items associated with an inbound shipment. To this end, the inventory management application 121 can receive inventory events from the fulfillment network 115 in connection with an inbound shipment, and in box 405, the items can be associated with a seller account 131.

In box 407, the inventory management application 121 can receive a loss claim from a seller in connection with a missing quantity of at least one item associated with an inbound shipment. In box 409, the inventory management application 121 can evaluate the validity of the claim. As described above, the inventory management application 121 can evaluate the validity of a claim based at least upon carrier status data, parcel weights associated with an inbound shipment, and other data as described above. In box 411, the inventory management application 121 can initiate a resolution if it can determine that the claim is valid.

Figure 5A:
FIGS. 5A-5B are example user interfaces rendered on a client in the networked environment of FIG. 1 according to various embodiments of the present disclosure.

Reference is now made to FIG. 5A, which illustrates one example of a user interface 441 that can be generated by the inventory management application 121 and/or rendered on a client 105 in connection with an inbound shipment to the fulfillment network 115. In the depicted user interface 441, a seller can view a quantity of items associated with an inbound shipment that have been confirmed as received by the fulfillment network 115. In one example, a seller can generate a claim associated with a potentially missing quantity of items from an inbound shipment received and processed by the fulfillment network 115. The seller can also acknowledge any overages recorded by the fulfillment network 115. In other words, the seller can acknowledge a scenario where the fulfillment network 115 records receipt of more units than expected. In some embodiments, a user interface can display various data associated with an inbound shipment, such as a shipment name or identifier, a specific destination fulfillment center 112 in the fulfillment network 115 for the shipment, the items expected in an inbound shipment, the items that have been confirmed as received by the fulfillment network 115, and other data that can be associated with an inbound shipment.

Figure 5B:

Reference is now made to FIG. 5B, which illustrates one example of a user interface 451 that can be generated by the inventory management application 121 and/or rendered on a client 105 in connection with a loss claim associated with a potentially missing quantity of an item associated with an inbound shipment to the fulfillment network 115. In the depicted example, the inventory management application 121 can generate the depicted user interface 451 in response to a loss claim submitted by a seller. The inventory management application 121 can request additional information from a seller in connection with the claim and validate the claim based upon shipment data associated with shipment as well as the additional information provided by the seller. In some scenarios, shipment data associated with a seller shipment 135 provided by a seller may not include carrier tracking data, bill of lading information, or other information related to the shipment. Accordingly, the step of validating a claim can include prompting a seller for additional information related to the shipment as well as items in a shipment. For example, the inventory management application 121 can prompt a seller for carrier tracking information, with which the carrier connector 125 can retrieve carrier tracking data, weight data, or other information from a carrier system 107. The depicted user interfaces of FIGS. 5A and 5B are illustrated to show some examples of functionality of the user interfaces that can be generated by the inventory management application 121. In some embodiments, the inventory management application 121 can also generate user interfaces that show a status of a loss claim, a status of loss claims on an item by item basis, an amount credited to the seller as compensation for missing items, and other information related to loss claims.

Figure 6:
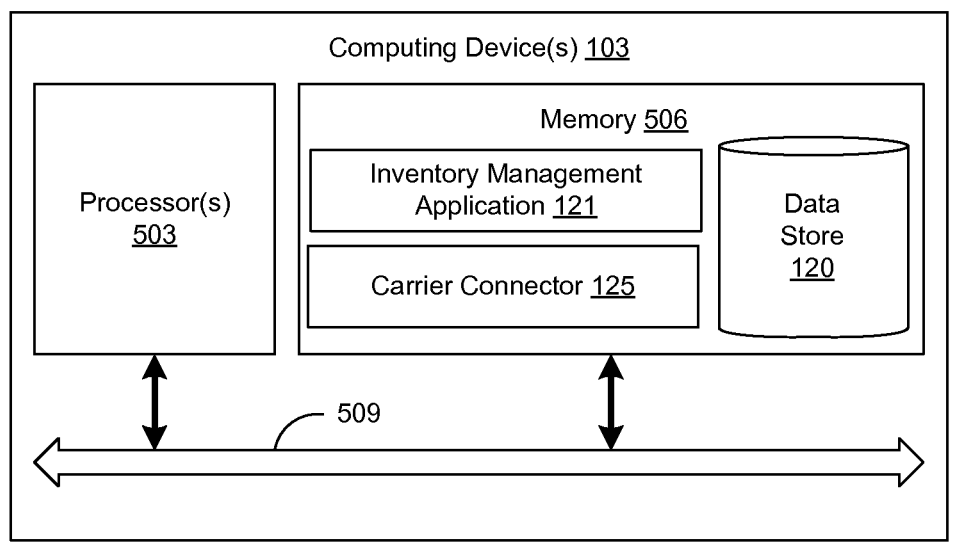
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the inventory management application 121, carrier connector 125, and potentially other applications. Also stored in the memory 506 may be a data store 120 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the inventory management application 121, carrier connector 125, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the inventory management application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including inventory management application 121, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that obtains shipment data associated with an inbound shipment to a fulfillment network, the shipment data comprising a carrier identifier associated with the inbound shipment and the inbound shipment comprising at least one parcel;
   code that obtains a claim associated with a missing quantity of the at least one item associated with the inbound shipment, the claim associated with a seller account;
   code that determines whether the inbound shipment is received in the fulfillment network;
   code that determines whether a carrier associated with the inbound shipment is associated with an approved carrier list;
   code that obtains carrier data from a carrier system;
   code that determines whether the carrier data reflects that at least one parcel associated with the inbound shipment is at least one of damaged or lost by the carrier; and
   code that initiates compensation to the seller account of a replacement value of the missing quantity of the at least one item when the carrier data reflects that at least one parcel associated with the inbound shipment is at least one of damaged or lost by the carrier when the carrier is associated with the approved carrier list, wherein the replacement value is based at least upon an average price associated with a plurality of sales listings of the at least one item in an electronic marketplace.

2. The non-transitory computer-readable medium of claim 1, wherein the program further comprises:
   code that identifies a listing associated with at least one like item corresponding to the at least one item in the electronic marketplace;
   code that initiates a purchase of the missing quantity of at least one like item in the electronic marketplace; and
   code that transfers ownership of the missing quantity at least one like item to the seller account.

3. A system, comprising:
   at least one computing device; and
   an inventory management application executable in the at least one computing device, the inventory management application comprising:
   logic that receives an inventory event from at least one computing device in a fulfillment network, the inventory event corresponding to a damaged item;
   logic that identifies a seller account that is associated with the inventory event; and
   logic that generates a resolution associated with the inventory event by removing the damaged item from a seller inventory in a data store in communication with the at least one computing device, the seller inventory being associated with the seller account, the logic that generates the resolution further transferring ownership of the damaged item to a holding account associated with the fulfillment network.

4. The system of claim 3, wherein the logic that generates the resolution associated with the inventory event further comprises:
   logic that determines a replacement value associated with the damaged item; and
   logic that initiates compensation to the seller account of the replacement value.

5. The system of claim 4, wherein the replacement value is based at least upon an average listing price associated with a plurality of listings for the damaged item in an electronic marketplace.

6. The system of claim 3, wherein the logic that generates the resolution associated with the inventory event further comprises:
   logic that identifies a listing associated with a like item in an electronic marketplace;
   logic that initiates a purchase of the like item in the electronic marketplace; and logic that transfers ownership of the like item to the seller account.

7. The system of claim 3, wherein the inventory management application further comprises:
  logic that receives a condition of the damaged item from the at least one computing device in the fulfillment network; and
  logic that generates a sales listing associated with the damaged item in an electronic marketplace.

8. The system of claim 3, wherein the inventory management application further comprises:
  logic that receives another inventory event from the at least one computing device in a fulfillment network, the other inventory event corresponding to another item that is: another damaged item;
  logic that identifies another seller account that is associated with the other inventory event;
  logic that updates another seller inventory associated with the other seller account to reflect a deficit corresponding to the other inventory event;
  logic that determines whether the damaged item and the other item are like items; and
  logic that assigns ownership of the damaged item from the holding account to the other seller account.

9. The system of claim 3, wherein the inventory event is an inventory addition event, and the inventory management application further comprises:
  logic that receives another inventory event from the at least one computing device in the fulfillment network, the other inventory event corresponding to another item that is another damaged item;
  logic that identifies another seller account that is associated with the other inventory event;
  logic that determines whether the inventory addition event is associated with the other seller account; and
  logic that assigns ownership of the damaged item from the seller account to the other seller account.

10. A method, comprising:
  detecting, in at least one computing device, a quantity of at least one item associated with an inbound shipment;
  associating, in the at least one computing device, the quantity of the at least one item with a seller account;
  determining, in the at least one computing device, whether there is a missing quantity of the at least one item associated with the inbound shipment;
  receiving, in the at least one computing device, a claim associated with the missing quantity of the at least one item;
  validating, in the at least one computing device, the claim based at least upon shipment data associated with the inbound shipment; and
  generating, in the at least one computing device, a resolution for the seller account when the claim is validated.

11. The method of claim 10, wherein generating the resolution for the seller account when the claim is validated further comprises:
  determining, in the at least one computing device, a replacement value associated with the missing quantity of the at least one item; and
  initiating, in the at least one computing device, compensation to the seller account of the replacement value.

12. The method of claim 11, wherein the replacement value is based at least upon an average listing price associated with a plurality of listings for the at least one item in an electronic marketplace.

13. The method of claim 10, further comprising:
  updating, in the at least one computing device, a seller inventory associated with the seller account to reflect a deficit corresponding to the missing quantity of the at least one item;
  designating, in the at least one computing device and upon expiration of a waiting period, the missing quantity of the at least one item as missing;
  determining, in the at least one computing device, a replacement value associated with the missing quantity of the at least one item; and
  initiating, in the at least one computing device, compensation to the seller account of the replacement value.

14. The method of claim 10, wherein generating the resolution further comprises:
  identifying, in the at least one computing device, a listing associated with a like item in an electronic marketplace;
  initiating, in the at least one computing device, a purchase of the like item in the electronic marketplace; and
  transferring, in the at least one computing device, ownership of the like item to the seller account.

15. The method of claim 10, wherein generating the resolution further comprises:
  receiving, in the at least one computing device, at least one found item inventory event associated with the missing quantity of the at least one item;
  removing, in the at least one computing device, the missing quantity of the at least one item from the seller account; and
  transferring ownership of the missing quantity of the at least one found item, in the at least one computing device, to a holding account associated with a fulfillment network.

16. The method of claim 15, wherein the missing quantity of the at least one item is found in the fulfillment network, and the method further comprises:
  receiving, in the at least one computing device, a condition of the missing quantity of the at least one item from the at least one computing device in the fulfillment network; and
  generating, in the at least one computing device, a sales listing associated with the at least one item in an electronic marketplace.

17. The method of claim 15, further comprising:
  detecting, in the at least one computing device, another quantity of the at least one item associated with another inbound shipment that is associated with another seller account;
  associating, in the at least one computing device, the other quantity of the at least one item with the other seller account;
  determining, in the at least one computing device, whether the other quantity was erroneously associated with the other seller account; and
  transferring, in the at least one computing device, ownership of the other quantity of the at least one item to the seller account when the other quantity was erroneously associated with the other seller account.

* * * * *